Nov. 3, 1970 D. T. ROSS 3,538,267
CRADLE FOR MAINTAINING A TELEPHONE HAND SET IN AN INVERTED POSITION
Filed June 12, 1968 3 Sheets-Sheet 1

INVENTOR
DAVID T. ROSS
BY [signature]
ATTORNEY

Nov. 3, 1970 D. T. ROSS 3,538,267

CRADLE FOR MAINTAINING A TELEPHONE HAND SET IN AN INVERTED POSITION

Filed June 12, 1968 3 Sheets-Sheet 2

Nov. 3, 1970

D. T. ROSS 3,538,267

CRADLE FOR MAINTAINING A TELEPHONE HAND SET IN AN INVERTED POSITION

Filed June 12, 1968

3 Sheets-Sheet 3

United States Patent Office 3,538,267

Patented Nov. 3, 1970

3,538,267

CRADLE FOR MAINTAINING A TELEPHONE HANDSET IN AN INVERTED POSITION

David T. Ross, Los Angeles, Calif., assignor, by mesne assignments, to the United States of America as represented by the Secretary of the Navy Filed June 12, 1968, Ser. No. 736,397
Int. Cl. H04m *1/06*
U.S. Cl. 179—146 7 Claims

ABSTRACT OF THE DISCLOSURE

This invention consists of a cradle for supporting a telephone handset in an inverted position. The cradle comprises a contoured body member and a flexible retainer which together form two recesses. The recesses are shaped so as to positively hold the mouth and ear pieces of the telephone handset when it is placed in the cradle. The handset may be released from the cradle by pressing in the flexible retainer.

STATEMENT OF GOVERNMENT INTEREST

The invention defined herein may be manufactured and used by or for the Government of the United States of America without the payment of any royalties thereon or therefor.

BACKGROUND OF THE INVENTION

Field of the invention

This invention is directed to a cradle for positively supporting a telephone handset. It is particularly designed for supporting a handset in an inverted position and for use in environments where the handset may be subject to a large outward force. Forces of the type contemplated are often experienced by accelerating aircraft. The invention has utility, however, in all instances where a telephone handset is to be supported.

Description of the prior art

The prior art generally does not provide means for supporting a telephone handset in an inverted position. The prior art does show methods of imparting positive support to a telephone. The art, however, does not show a device which not only provides a high degree of resistance to an outward pull on a handset, but also allows for easy removal of the handset with a much lower resistance.

SUMMARY OF THE INVENTION

This invention presents a significant advance over the prior art. The cradle contemplated by the present invention is capable of imparting positive support to a telephone handset in an inverted position. Furthermore, the invention allows the handset to be removed with a much lower force than it normally applies to the handset.

The cradle comprises a basket-shaped body member and a flexible retainer. The retainer is attached to the inside of the body member and its shape conforms essentially to the inner face of a standard telephone handset. The retainer and the body member form recesses for the mouth and ear pieces of the handset. The handset is inserted in the cradle and is held in place by the positive force of the retainer. The retainer exerts a horizontal force at the grooves formed by the handle and the mouth piece, and the handle and the ear piece. This force binds the handset to the body member and the friction force set up resists outward forces applied to the handset. The handset may be released with a minimum force by depressing any of the upstanding corners of the retainer.

It is an object of this invention to provide a cradle for holding a telephone handset in an inverted position.

It is a further object of this invention to provide a cradle for a telephone handset which is capable of retaining a telephone handset when large outward forces are applied to the handset.

It is a still further object of this invention to provide a cradle for a telephone handset wherein the force that is necessary to remove the handset from the cradle is much lower than that which normally restrains the handset.

Other objects, advantages and novel features of the present invention will become apparent from the following detailed description of the invention when considered in conjunction with the accompanying drawings.

DESCRIPTION OF THE PREFERRED EMBODIMENT

Figure 1:
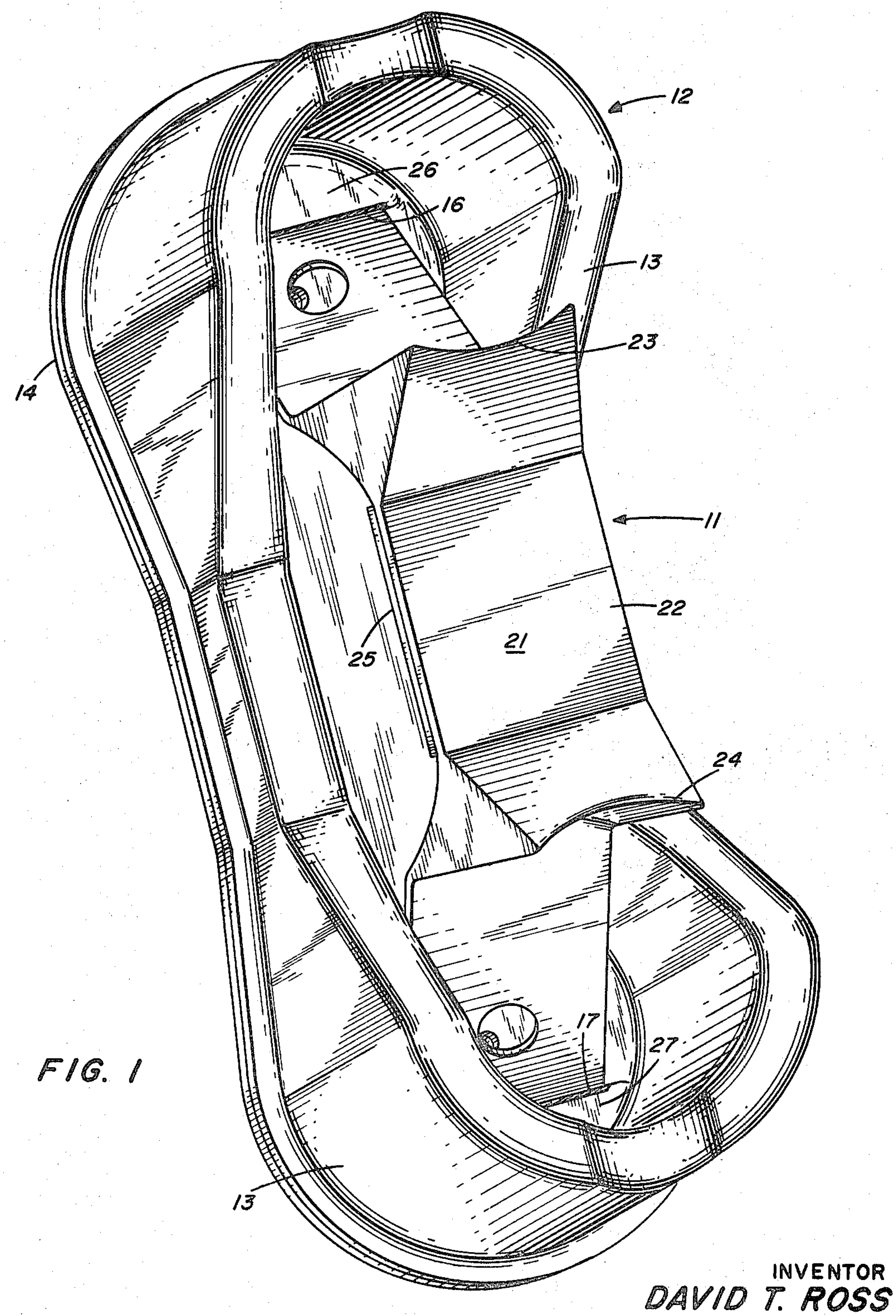
FIG. 1 is a isometric view of the cradle mounted on a support.

Referring to the drawings, the cradle 11 consists essentially of a basket-shaped member 12 and a flexible retainer 21. The cradle is normally installed in an overhead position and therefore has smooth, rounded contours.

Figure 3:
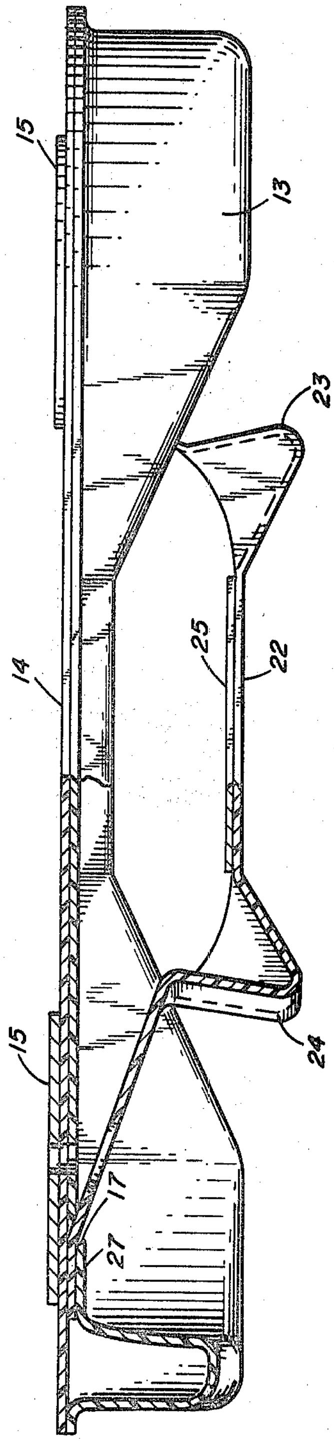
FIG. 3 is a partial cross-sectional view of FIG. 2 without the handset.
Figure 6:
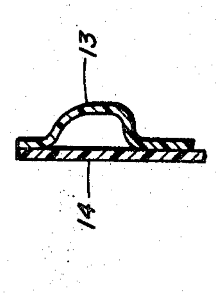
FIG. 6 is a cross-sectional view of the cradle taken along line 6—6 of FIG. 4.

Basket-shaped member 12 has two parts, a body 13 and a base 14. Body 13 forms the bottom of basket-shaped member 12. Body 13 comprises a flat sheet whose edge is formed into an oblong trough (FIGS. 3 and 6). Body 13 and base 14 are rigidly attached to each other by cement or the like.

Spacers 15 are provided for attachment of the cradle to a flat surface. Base 14 and body 13 have holes in both ends. The holes are concentric with holes in spacers 15 (FIG. 3). The cradle can be attached to a surface by screws or the like inserted at these holes.

Figure 2:
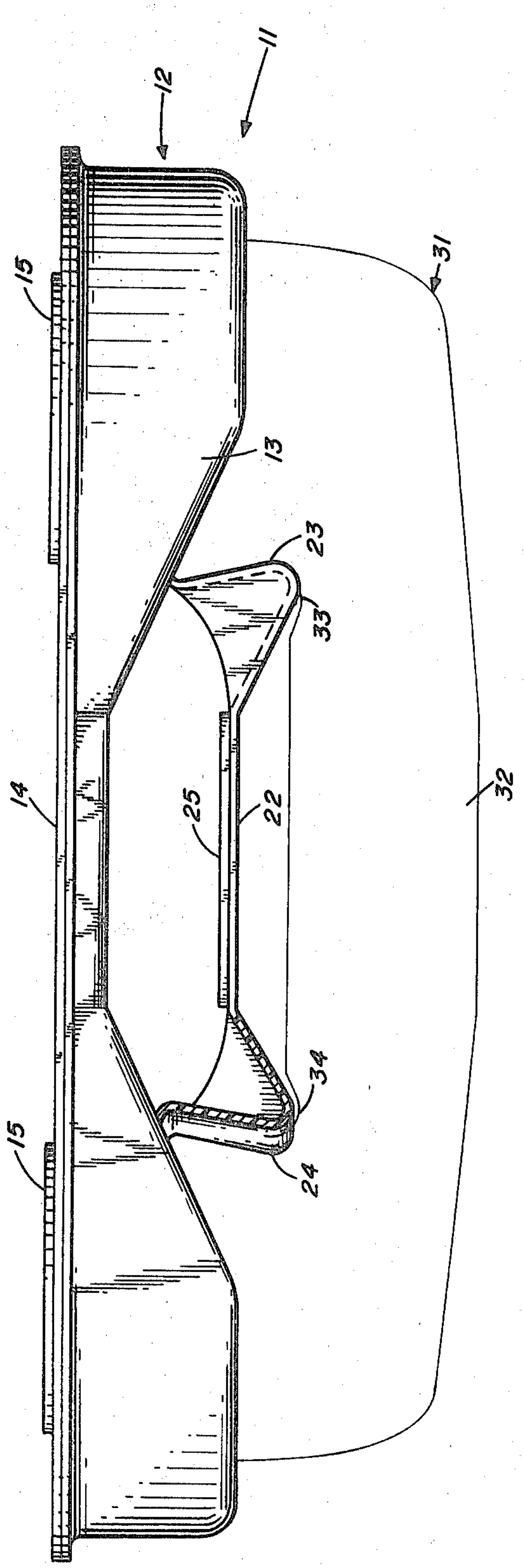
FIG. 2 is a side view of the cradle and a telephone handset.
Figure 4:
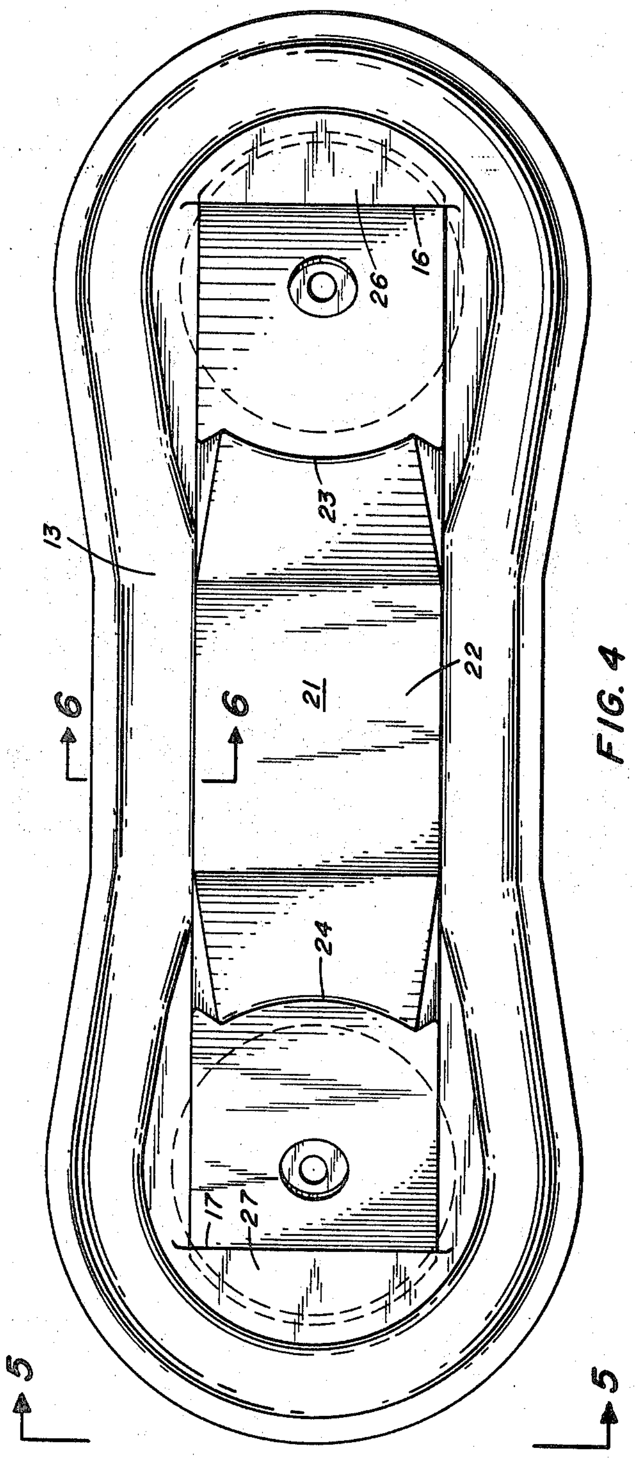
FIG. 4 is a bottom view of the cradle.

Retainer 21 is flexible. Its long sides are parallel and it is shaped to fit the inside dimensions of a standard telephone handset. Cusps 23 and 24 are located on either side of the center portion 22 (FIGS. 2 and 3). The ends 26 and 27 are flat and rounded. The retainer is rigidly secured to base 14 and body member 13 at slits 16 and 17. Holes are provided in the retainer concentric with the holes in the spacer base and body member (FIGS. 3 and 4). These holes have a larger diameter than the others and allow for the insertion of a screw driver or the like. Flat plate 25 is attached to center portion 22 for reinforcement.

Figure 5:
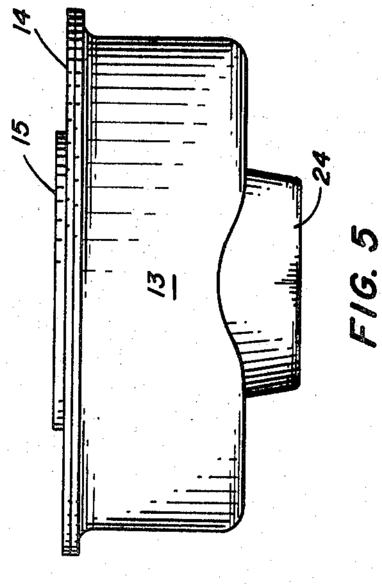
FIG. 5 is an end view of the cradle.

In operation, the handset is pressed into the recesses formed by basket-shaped member 12 and retainer 21 (FIG. 2). Small indentations are provided in body member 13 (FIG. 5) to facilitate reception of the handset. Cusps 23 and 24 of the retainer engage the elbows formed by the handle 32 and the mouthpiece 33 and ear piece 34, respectively, of receiver 31. The handset is bound by the positive force exerted by the retainer to body member 13. The friction forces set up are capable of resisting an outward force on the handset which is up to eight times its weight (8 G's). The handset may be released by depressing any of the corners of cusps 23 or 24.

The inventive cradle insures that a handset supported therein may be released with a force much lower than that applied to it when it is firmly held by the retaining means.

As a practical matter, this means that the handset itself will not be subject to the stress of the restraining force upon removal and that it may easily be removed.

It is seen, therefore, that a new and improved means for supporting a telephone handset has been provided.

Obviously, many modifications and variations are possible in light of the above teachings. It is therefore to be understood that within the scope of the appended claims the invention may be practiced otherwise than as specifically described.

What is claimed is:

1. A cradle for a telephone handset comprising:
- a relatively rigid elongated body member having a back side adapted to lie along a wall or similar flat surface and including a hollow interior portion;
- a flexible retaining member having an elongated curved shape;
- the ends of said retaining member being attached to said elongated body member within the hollow interior portion so as to form a recess at either end of said hollow interior portion for receiving a mouthpiece and ear piece of a telephone handset; and
- means integral with and projecting from said retaining member for acting upon said telephone handset first to maintain said mouth and ear pieces within said recesses against relatively large forces and second to release said mouth- and earpieces at a lesser force upon a manual manipulation of said means.

2. A cradle for a telephone handset as in claim 1 further characterized in that:
- the edge of said body member is formed into an oblong trough.

3. A cradle for a telephone handset as in claim 2 further characterized in that:
- the width of said flexible retainer is narrow in relation to the width of said body member; and

- the sides of said retainer are substantially parallel to the sides of said body member.

4. A cradle for a telephone handset as in claim 3 further comprising:
- a flat base to which said body member is rigidly attached.

5. A cradle for a telephone handset as in claim 4 further characterized in that:
- said body member is slotted at either end; and
- the ends of said flexible retainer are flat and are attached to said base member and said body member at said slot.

6. A cradle for a telephone handset as in claim 5 further characterized in that:
- the center portion of said flexible member is flat; and
- said means for acting upon said telephone handset comprises cusps formed in said flexible retainer on either side of said center portion.

7. A cradle for a telephone handset as in claim 6 further characterized in that:
- the cusps of the flexible retainer are contoured to fit the junctions formed where the handle joins the mouth- and earpieces of a telephone handset; and
- the cusps are located in such a position in the flexible retainer so as to tightly bind a telephone handset to the body member.

References Cited

UNITED STATES PATENTS

| | | | |
|---|---|---|---|
| 1,981,649 | 11/1934 | King | 179—100 |
| 2,639,334 | 5/1953 | Fleming | 179—146 |
| 3,167,617 | 1/1965 | Gerhardt. | |
| 3,334,196 | 8/1967 | Pearlman | 179—179 |

KATHLEEN H. CLAFFY, Primary Examiner

R. P. MYERS, Assistant Examiner